United States Patent [19]

Kato et al.

[11] Patent Number: 4,466,395
[45] Date of Patent: Aug. 21, 1984

[54] FLOW CONTROL DEVICE OF A HELICALLY-SHAPED INTAKE PORT

[75] Inventors: Shinichi Kato; Yoshihiko Dohi; Katsuhiko Motosugi, all of Toyota; Ituo Koga, Okazaki, all of Japan

[73] Assignee: Toyota Jidosha Kogyo Kabushiki Kaisha, Aichi, Japan

[21] Appl. No.: 391,378

[22] Filed: Jun. 23, 1982

[30] Foreign Application Priority Data

Jun. 29, 1981 [JP] Japan .................................. 56-99737

[51] Int. Cl.³ ...................... F02B 31/00; F02M 35/10
[52] U.S. Cl. ................................. 123/188 M; 123/306
[58] Field of Search .................. 123/188 M, 306, 308, 123/52 M, 432

[56] References Cited

U.S. PATENT DOCUMENTS

| | | | |
|---|---|---|---|
| 3,850,479 | 11/1974 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,347,816 | 9/1982 | Saito et al. | 123/188 M |

FOREIGN PATENT DOCUMENTS

| | | |
|---|---|---|
| 2059008 | 6/1972 | Fed. Rep. of Germany . |
| 143289 | 8/1980 | German Democratic Rep. ............. 123/188 M |
| 52-127113 | 9/1977 | Japan . |
| 58129 | 5/1979 | Japan . |
| 19945 | 2/1980 | Japan ............. 123/308 |
| 54922 | 5/1981 | Japan . |
| 68519 | 4/1982 | Japan . |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve and a substantially straight inlet passage portion tangentially connected to the helical portion. A bypass passage is branched off from the inlet passage portion and connected to the helical portion. A rotary valve is arranged in the bypass passage and actuated by a vacuum operated diaphragm apparatus. The rotary valve is opened when the amount of air fed into the cylinder of an engine is increased beyond a predetermined value. A cooling water passage is arranged beneath and near the bypass passage.

19 Claims, 15 Drawing Figures

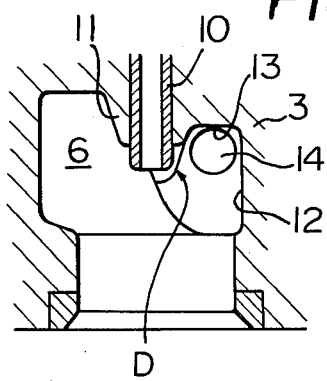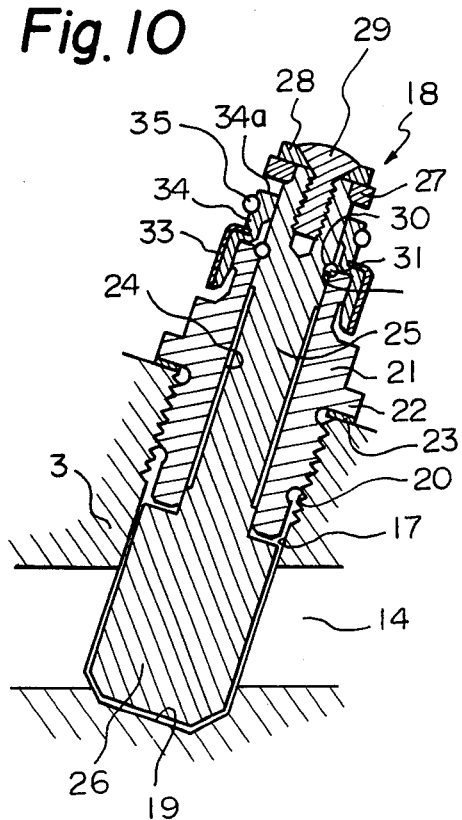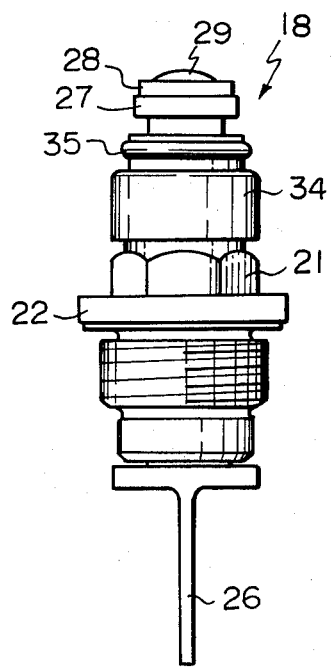

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve, actuated by an actuator, is arranged in the bypass passage and opened under the operation of the actuator when the amount of air fed into the cylinder of the engine is larger than a predetermined amount.

In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port and, thus, enables high volumetric efficiency.

This flow control device, however, is just the embodiment of the basic principle of operation. In order to commercialize such a flow control device, various problems remain to be solved, for example, how to reduce manufacturing time and manufacturing cost, how to easily manufacture the flow control device, and how to obtain reliable flow control device operation.

SUMMARY OF THE INVENTION

An object of the present invention is to provide a flow control device with a helically-shaped intake port, which has a construction suited for commercializing the basic principle of operation proposed by the inventor.

According to the present invention, there is provided a device for controlling the flow in a helically-shaped intake port of an internal combustion engine, said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion, said bypass passage having a bottom wall; a normally closed rotary valve arranged across said bypass passage for controlling the flow area of said bypass passage; a cooling water passage arranged beneath and near the bottom wall of said bypass passage; and actuating means for actuating said rotary valve in response to the change in the amount of air fed into the intake port to open said rotary valve when said amount of air is increased beyond a predetermined value.

The present invention may be more fully understood from the description of preferred embodiments of the invention set forth below, together with the accompanying drawings.

BRIEF DESCRIPTION OF THE DRAWINGS

In the drawings:

FIG. 9 is a cross-sectional view taken along the line IX—IX in FIG. 5;

FIG. 10 is a cross-sectional side view of a rotary valve;

FIG. 11 is a side view of FIG. 10;

FIG. 12 is a plan view of a positioning ring;

DESCRIPTION OF PREFERRED EMBODIMENTS

Figure 1:
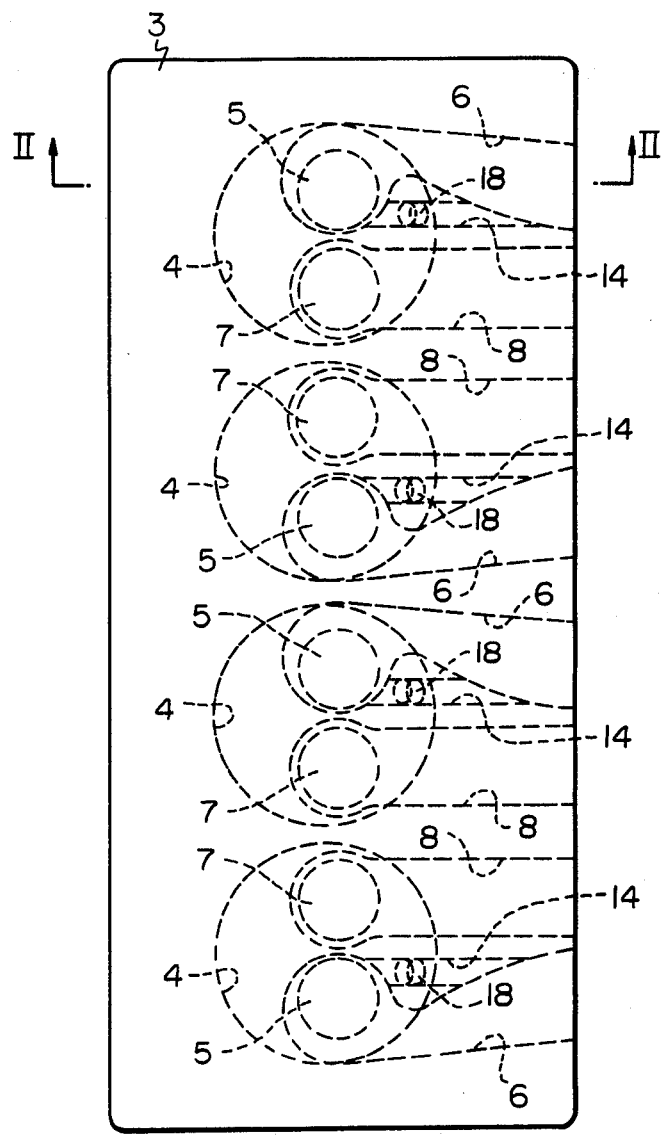
FIG. 1 is a plan view of an internal combustion engine according to the present invention.
Figure 2:
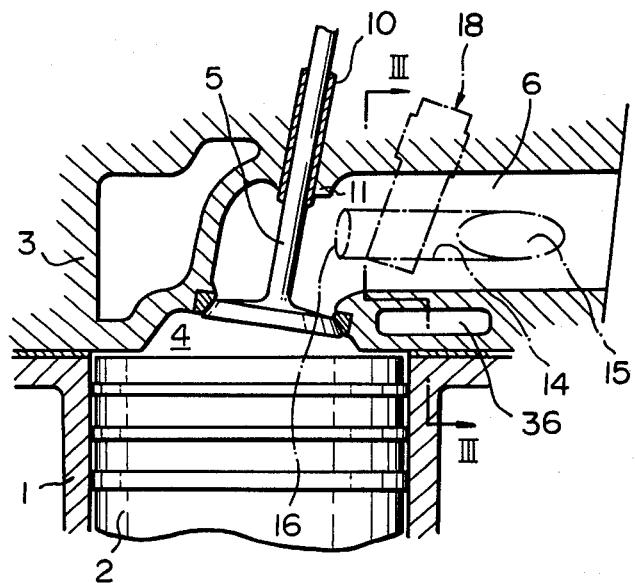
FIG. 2 is a cross-sectional view taken along the line II—II in FIG. 1.
Figure 3:
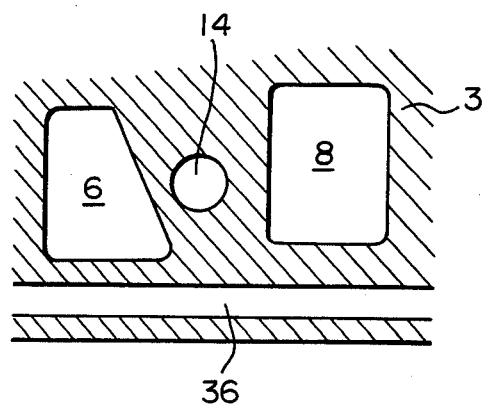
FIG. 3 is a cross-sectional view taken along the line III—III in FIG. 2.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 4:
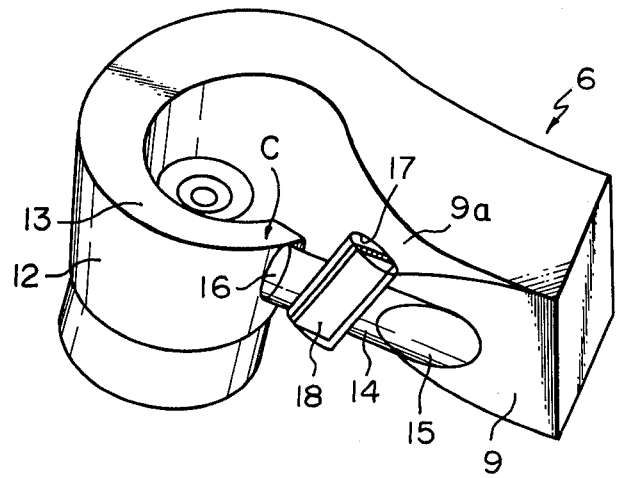
FIG. 4 is a perspective view schematically illustrating the shape of a helically shaped-intake port.
Figure 5:
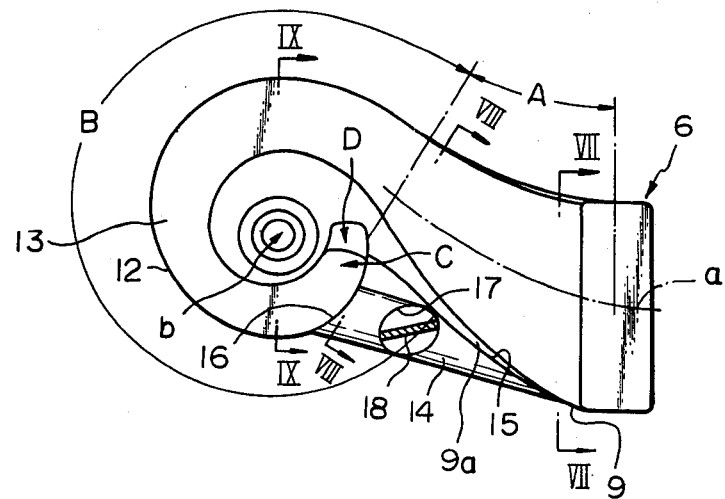
FIG. 5 is a plan view of FIG. 4.
Figure 6:
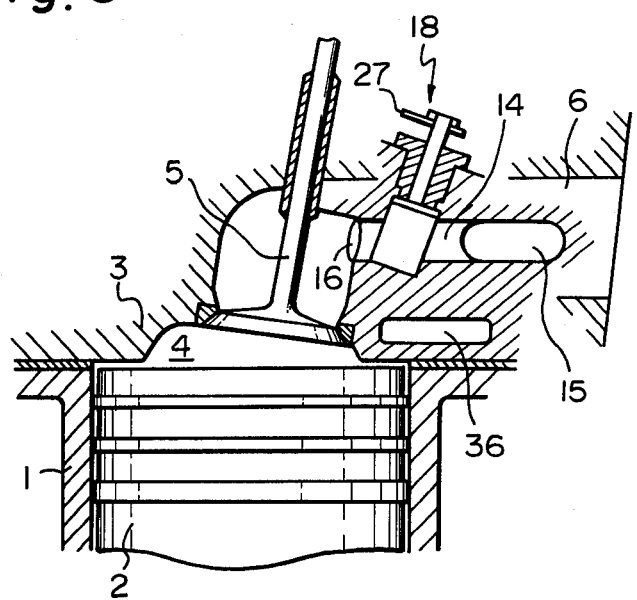
FIG. 6 is a cross-sectional view taken along the bypass passage in FIG. 4.
Figure 7:
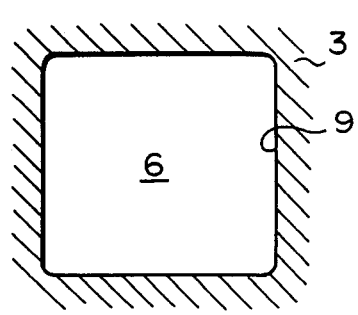
FIG. 7 is a cross-sectional view taken along the line VII—VII in FIG. 5.

FIGS. 4 through 6 schematically illustrate the shape of the helically-shaped intake port 6 illustrated in FIG. 2. As illustrated in FIG. 5, the helically-shaped intake port 6 comprises an inlet passage portion A, the longitudinal central axis of which is slightly curved, and a helical portion B, formed around the valve stem of the intake valve 5. The inlet passage portion A is tangentially connected to the helical portion B.

Figure 8:
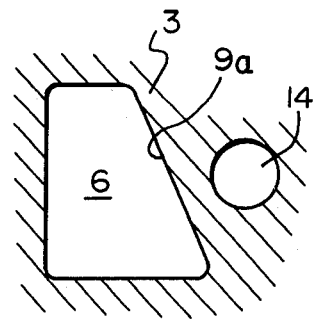
FIG. 8 is a cross-sectional view taken along the line VIII—VIII in FIG. 5.

As illustrated in FIGS. 4, 5 and 8, the side wall 9 of the inlet passage portion A, which is located near the helical portion B, has on its upper portion an inclined wall portion 9a which is arranged to be directed downwards. The width of the inclined wall portion 9a is gradually increased toward the helical portion B. As illustrated in FIG. 8, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

As illustrated in FIGS. 1 through 6, bypass passages 14, branched off from the inlet passage portions A of the corresponding intake ports 6 and having a substantially uniform cross-section, are formed in the cylinder head 3. Each of the bypass passages 14 is connected to the helix terminating portion C of the corresponding intake port 6. Each of the inlet openings 15 of the bypass passages 14 is formed on the side wall 9 at a position located near the inlet open end of the inlet pasage portion A of the corresponding intake port 6. Each of the outlet openings 16 of the bypass passages 144 is formed on the upper end portion of the side wall 12 at the helix terminating portion C of the corresponding intake port 6.

In addition, valve insertion bores 17, extending across the corresponding bypass passages 14, are formed in the cylinder head 3. Rotary valves 18, each functioning as a flow control valve, are inserted into the corresponding valve insertion bores 17.

Referring to FIG. 10, each of the valve insertion bores 17 is a cylindrical bore drilled downwardly from the upper surface of the cylinder head 3 and having a uniform diameter over the entire length thereof. The valve insertion bore 17 extends downward beyond the bypass 14 and, thus, a recess 19 is formed on the bottom wall of the bypass passage 14. An internal thread 20 is formed on the upper portion of the valve insertion bore 17 and a rotary valve holder 21 is screwed into the internal thread 20. The rotary valve holder 21 has a circumferential flange 22 on the outer circumferential wall thereof. A seal member 23 is inserted between the flange 22 and the cylinder head 3. A bore 24 is formed in the rotary valve holder 21, and a valve shaft 25 of the rotary valve 18 is rotatably inserted into the bore 24. A thin plate-shaped valve body 26 is fixed onto the lower end of the valve shaft 25, and an arm 27 is fixed onto the top end of the valve shaft 25 by means of a bolt 29 via a washer 28. A ring groove 30 is formed on the outer circumferential wall of the valve shaft 25 at a level which is almost the same as that of the top end face of the rotary valve holder 21, and a C-shaped positioning ring 31 (FIG. 12) is fitted into the ring groove 30. The positioning ring 31 engages with a frustum-shaped face 32 formed on the inner periphery of the top end wall of the rotary valve holder 21 for retaining the valve body 26 at a predetermined position. A seal member 34, surrounded by a reinforcement frame 33, is fitted onto the upper portion of the rotary valve holder 21. The seal portion 34a of the seal member 34 is pressed in contact with the outer circumferential wall of the valve shaft 25 by means of an elastic ring 35 which is inserted around the outer circumferential wall of the seal member 34. Consequently, the bypass passage 14 is completely shielded from ambient air by means of the seal members 23, 34. Since the seal member 34 is fixed onto the rotary valve holder 21, the valve shaft 25 rotates relative to the seal portion 34a of the seal member 34 when the rotary valve 18 rotates. Consequently, it is preferable that the inner surface of the seal portion 34a of the seal member 34 be covered by a thin layer made of tetrafluoroethylene for reducing the frictional resistance between the seal member 34 and the valve shaft 25.

As illustrated in FIG. 10, the valve body 26 has a width which is slightly smaller than the inner diameter of the valve insertion bore 17, and the valve body 26 is arranged so that the lower end thereof is slightly spaced from the bottom wall of the recess 19. On the other hand, as ilustrated in FIGS. 2 and 3, a cooling water passage 36 is formed in the cylinder head 3 at a position located beneath and near the bypass passage 14, and the exhaust port 8 is arranged laterally to and near the bypass passage 14.

Figure 13:
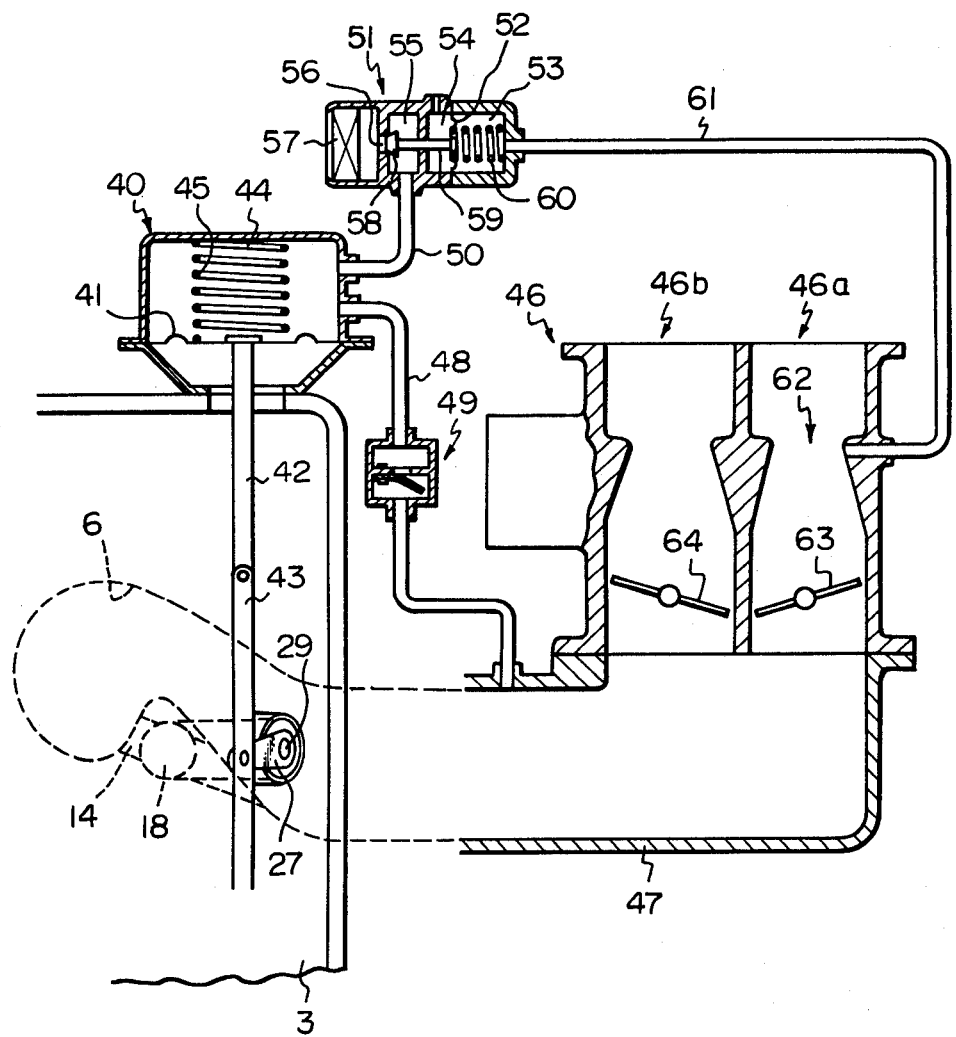
FIG. 13 is a view illustrating the entirety of a flow control device.

Referring to FIG. 13, the tip of the arm 27 fixed onto the tope end of the valve shaft 25 is connected via a connecting rod 43 to a control rod 42 which is fixed onto a diaphragm 41 of a vaccum operated diaphragm apparatus 40. The diaphragm apparatus 40 comprises a vacuum chamber 44 separated from the atmosphere by the diaphragm 41. A compression spring 45 for biasing the diaphragm 41 is inserted into the vacuum chamber 44.

An intake manifold 47, equipped with a compound type carburetor 46 comprising a primary carburetor A and a secondary carburetor B, is mounted on the cylinder head 3. The vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52. In addition, the control valve 51 further comprises a valve chamber 55 arranged adjacent to the atmospheric pressure chamber 54. The valve chamber 55 is connected, on one hand, to the vacuum chamber 44 via the atmosphere conduit 50 and, on the other hand, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53. The vacuum chamber 53 is connected to a venturi portion 62 of the primary carburetor A via a vacuum conduit 61.

The carburetor 46 is a conventional carburetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor A is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves toward the right in FIG. 13 against the compression spring 60. As a result of this, the valve body 58 opens the valve port 56 and, thus, the vacuum chamber 44 of the diaphragm apparatus 40 becomes open to the atmosphere. At this time, the diaphragm 41 moves downward in FIG. 13 due to the spring force of the compression spring 45 and, thus, the rotary valve 18 is rotated and fully opens the bypass passage 14.

On the other hand, in the case wherein the opening degree of the primary throttle valve 63 is small, since the vacuum produced in the venturi portion 62 is small, the diaphragm 52 of the control valve 51 moves toward the left in FIG. 13 due to the spring force of the compression spring 60. As a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produce in the vacuum chamber 44 and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 13 against the compression spring 45. As a result, the rotary valve 18 is rotated and closes the bypass passage 14. Consequently, when the engine is operating at a low speed under a light load, the bypass passage 14 is closed by the rotary valve 18. In the case wherein the engine speed is low even if the engine is operating under a heavy load and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 14 is closed by the rotary valve 18.

As mentioned above, when the engine is operating at a low speed under a light load, that is, when the amount of air fed into the cylinder of the engine is small, the rotary valve 18 closes the bypass passage 14. At this time, the mixture introduced into the inlet passage portion A moves downward, while swirling, along the upper wall 13 of the helical portion B. Then, since the mixture, while swirling, flows into the combustion chamber 4, a strong swirl motion is created in the combustion chamber 4.

When the engine is operating at a high speed under a heavy load, that is, when the amount of air fed into the cylinder of the engine is large, since the rotary valve 18 opens the bypass passage 14, a part of the mixture introduced into the inlet passage portion A is fed into the helical portion B via the bypass passage 14 having a low flow resistance. Since the flow direction of the mixture stream flowing along the upper wall 13 of the helical portion B is deflected downward by the steeply inclined wall D of the helix terminating portion C, a great vacuum is produced at the helix terminating portion C, that is, in the outlet opening 16 of the bypass passage 14. Consequently, since the pressure difference between the vacuum in the inlet passage portion A and the vacuum in the helix terminating portion C becomes large, a large amount of the mixture is fed into the helical portion B via the bypass passage 14 when the rotary valve 18 opens. As mentioned above, when the engine is operating at a high speed under a heavy load, since the rotary valve 18 opens, the entire flow area of the intake port 6 is increased and a large amount of the mixture is fed into the helical portion B via the bypass passage 14 having a low flow resistance. As a result of this, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small. This makes it possible to further increase volumetric efficiency when the engine is operating at a high speed under a heavy load.

As mentioned above, when the engine is rotating at a low speed under a light load, the rotary valve 18 closes the bypass passage 14. At this time, if fuel is accumulated in the bypass passage 14 located upstream of the rotary valve 18, when the rotary valve 18 opens, the fuel thus accumulated is fed into the cylinder of the engine. As a result of this, since the air-fuel mixture fed into the cylinder of the engine becomes temporarily rich, a problem occurs in that the exhaust emission will deteriorate. However, in the present invention, as illustrated in FIG. 10, since a gap is formed between the lower end of the valve body 26 and the bottom wall of the recess 19, fuel flows into the helical portion B via that gap. This makes it possible to prevent fuel from accumulating in the bypass passage 14.

In the present invention, since the rotary valve 18 is inclined, it is necessary to form the recess 19 on the bottom wall of the bypass passage 14 for receiving the lower end of the valve body 26. Normally, if the recess 19 is formed on the bottom wall of the bypass passage 14, fuel easily accumulates in the recess 19. Nevertheless, in the present invention, since the cooling water passage 36 and the exhaust port 8 are arranged in the vicinity of the bypass passage 14, as previously mentioned, the bottom wall of the recess 19 is heated by the cooling water of the engine and the exhaust gas. As a result of this, the vaporization of fuel located within the recess 19 is promoted. This makes it possible to suppress fuel from accumulating in the recess 19.

Figure 14:
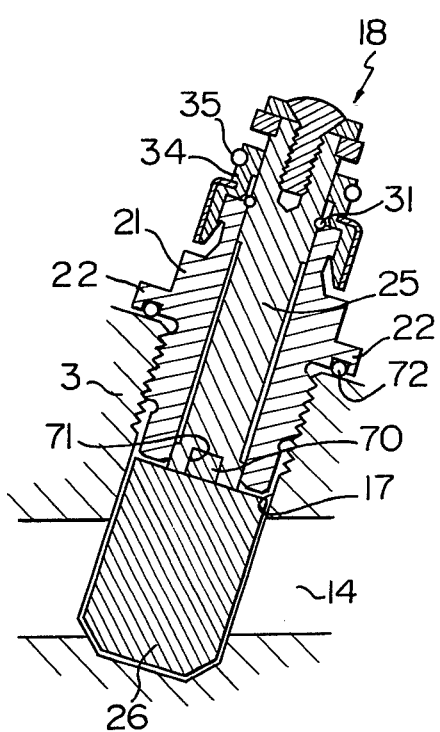
FIG. 14 is a cross-sectional side view of another embodiment of the rotary valve.

FIG. 14 illustrates another embodiment of the rotary valve 18. In this embodiment, the valve body 26 and the valve shaft 25 are separately formed, and a projection 70 formed in one piece on the top of the valve body 26 is fitted into a bore 71 formed on the lower end of the valve shaft 25. In addition, in this embodiment, instead of using the seal member 23 (FIG. 10), an O ring 72 is inserted between the cylinder head 3 and the flange 22 of the rotary valve holder 21.

Figure 15:
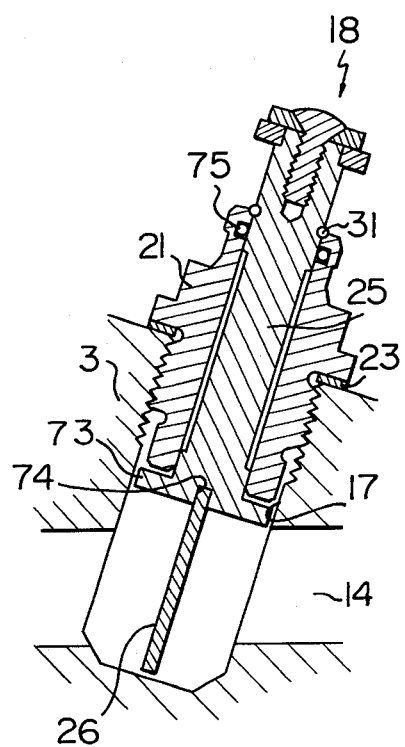
FIG. 15 is a cross-sectional side view of a further embodiment of the rotary valve.

FIG. 15 illustrates a further embodiment of the rotary valve 18. In this embodiment, a disc-shaped enlarged portion 73 is formed in one piece on the lower end of the valve shaft 25. A thin plate-shaped valve body 26 is welded to the enlarged portion 73 after the valve body 26 is fitted into a diametrically extending groove 74 formed on the lower surface of the enlarged portion 73. In addition, on O ring 75 is inserted between the valve shaft 25 and the rotary valve holder 21. The bypass passage 14 is shielded from ambient air by means of the O ring 75. Consequently, in this embodiment, it is possible to omit the seal member 34 illustrated in FIG. 14.

According to the present invention, since the rotary valve can be assembled to the cylinder head by merely inserting the rotary valve into the valve insertion bore, the assembling operation of the rotary valve becomes very easy. In addition, since the rotary valve has a small size and a simple construction, the manufacturing cost of the rotary valve can be reduced and the rotary valve can be easily assembled to the cylinder head even if the cylinder head little space on the upper face thereof. Furthermore, since the bypass passage is formed so that the inner wall thereof is heated by the cooling water of the engine and the exhaust gas, the vaporization of fuel in the bypass passage is promoted. Since the bypass passage is formed so that fuel can pass through the rotary valve even if the rotary valve is closed, it is possible to suppress fuel from accumulating in the bypass passage when the rotary valve is closed. As a result, since there is no changer that a rich air-fuel mixture will be fed into the cylinder of the engine immediately after the rotary valve opens, good exhaust emission can be obtained.

While the invention has been described with reference to specific embodiments chosen for purposes of illustration, it should be apparent that numerous modifications could be made thereto by those skilled in the art without departing from the spirit and scope of the invention.

We claim:

1. A device for controlling the flow in a helically-shaped intake port of a cylinder head of an internal combustion engine in order to increase the volumetric efficiency of the engine, said intake port comprising a helical portion around an intake valve, and a substantially straight inlet passage portion tangentially connected to the helical portion and having a helix terminating portion, said device comprising:
   a bypass passage entirely within said cylinder head, said bypass passage having one end directly connected to the inlet passage portion and its other end opening into an upper end of the helix terminating portion of the helical portion such that the flow into the upper end of the helix terminating portion from the bypass portion is in a direction opposite to a swirl flow in the helix terminating portion;
   a normally closed rotary valve arranged in said bypass passage for controlling the flow area of said bypass passage;
   a cooling water passage arranged beneath and near the bottom wall of said bypass passage; and
   actuating means for actuating said rotary valve in response to the change in the amount of air fed into the intake port to open said rotary valve when said amount of air is increased beyond a predetermined value, the opening of the valve reducing the swirl flow and thereby increasing the volumetric efficiency.

2. A device according to claim 1, wherein a recess is formed on the bottom wall of said bypass passage for receiving a lower end of said rotary valve, said cooling water passage being arranged beneath and near said recess.

3. A device according to claim 2, wherein the lower end of said rotary valve is spaced from a bottom wall of said recess.

4. A device according to claim 1, wherein said bypass passage has an outlet opening which is open to the helical portion at a position near a top wall of the helical portion.

5. A device according to claim 4, wherein the top wall of the helical portion has a steeply inclined wall portion at the helix terminating portion, the outlet opening of said bypass passage being arranged near said steeply inclined wall portion.

6. A device according to claim 1, wherein the intake passage portion has an inlet open end located furthest from the helical portion, said bypass passage having an inlet opening which is open to the inlet passage portion at a position near said inlet open end.

7. A device according to claim 6, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

8. A device according to claim 7, wherein the intake port comprises a valve guide projecting into the helical portion from an upper wall of the helical portion and having a circumferential wall, said downwardly inclined portion being tangentially connected to the circumferential wall of said valve guide.

9. A device according to claim 1, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum vacuum which has been produced in the intake port when the amount of air fed into the intake port is smaller than said predetermined value and connecting said vacuum chamber to the atmosphere when said amount of air is larger than said predetermined value.

10. A device according to claim 9, wherein said control apparatus comprises a check valve arranged between the intake port and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

11. A device according to claim 10, wherein the engine comprises a carburetor connected to the intake port and having a venturi portion, said control valve being actuated in response to a change in the level of the vacuum produced in said venturi portion.

12. A device according to claim 11, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

13. A device according to claim 1, wherein said engine has a cylinder head having a cylindrical bore formed therein, said rotary valve being arranged in said cylindrical bore.

14. A device according to claim 13, wherein said cylindrical bore extends across said bypass passage and has a substantially uniform cross-section.

15. A device according to claim 13, wherein said rotary valve comprises a valve holder fixed onto the cylinder, a valve shaft rotatably supported by said valve holder and a thin plate-shaped valve body fixed onto said valve shaft and extending across said bypass passage.

16. A device according to claim 15, wherein said valve body is formed in one piece on said valve shaft.

17. A device according to claim 15, wherein said valve body and said valve shaft are separately formed.

18. A device according to claim 15, wherein a seal member is inserted between said valve holder and the cylinder head.

19. A device according to claim 15, wherein a seal member is inserted between said valve shaft and said valve holder.

* * * * *